(12) United States Patent
Schmitz et al.

(10) Patent No.: US 11,762,083 B2
(45) Date of Patent: Sep. 19, 2023

(54) METHOD FOR DETERMINING THE POSITION OF AN OBJECT, DEVICE FOR DETERMINING THE POSITION OF AN OBJECT, AND SYSTEM

(71) Applicant: Rheinmetall Waffe Munition GmbH, Unterlüß (DE)

(72) Inventors: Jürgen Schmitz, Gifhorn (DE); Markus Jung, Unterlüß (DE); Michael Camp, Celle (DE); Alexander Graf, Unterlüß (DE); Ellen Dudek, Röthenbach (DE)

(73) Assignee: Rheinmetall Waffe Munition GmbH, Unterlüß (DE)

( * ) Notice: Subject to any disclaimer, the term of this patent is extended or adjusted under 35 U.S.C. 154(b) by 303 days.

(21) Appl. No.: 17/291,094

(22) PCT Filed: Oct. 30, 2019

(86) PCT No.: PCT/EP2019/079642
§ 371 (c)(1),
(2) Date: May 4, 2021

(87) PCT Pub. No.: WO2020/104154
PCT Pub. Date: May 28, 2020

(65) Prior Publication Data
US 2022/0003861 A1 Jan. 6, 2022

(30) Foreign Application Priority Data
Nov. 19, 2018 (DE) .................... 10 2018 128 962.6

(51) Int. Cl.
*G01S 13/87* (2006.01)
*G01S 7/41* (2006.01)
(Continued)

(52) U.S. Cl.
CPC .............. *G01S 13/876* (2013.01); *G01S 7/41* (2013.01); *G01S 13/46* (2013.01); *G01S 13/75* (2013.01);
(Continued)

(58) Field of Classification Search
CPC .......... G01S 13/876; G01S 7/41; G01S 13/46; G01S 13/75; G01S 13/887; G01S 2013/468
(Continued)

(56) References Cited

U.S. PATENT DOCUMENTS 5,459,570 A * 10/1995 Swanson .............. G01B 9/0201
356/479
6,799,141 B1 * 9/2004 Stoustrup ............ H04L 25/0214
342/204
(Continued)

FOREIGN PATENT DOCUMENTS

DE 19711863 A1 * 9/1998 .......... G01N 29/348
DE 102006038627 A1 2/2008
(Continued)

OTHER PUBLICATIONS

International Search Report from corresponding PCT Application PCT/EP2019/079642, dated Jan. 17, 2020.

*Primary Examiner* — Nuzhat Pervin
(74) *Attorney, Agent, or Firm* — Harness, Dickey & Pierce, P.L.C.

(57) ABSTRACT

The invention relates to a method for determining a position of an object, which comprises at least one non-linear component, in particular one semiconductor component, which, when irradiated with high-frequency transmitted signals from at least two different positions, produces and emits object signals having twice and/or three times the frequency of the respective transmitted signals.

15 Claims, 7 Drawing Sheets

(51) Int. Cl.
  *G01S 13/46* (2006.01)
  *G01S 13/75* (2006.01)
  *G01S 13/88* (2006.01)
(52) U.S. Cl.
  CPC ....... *G01S 13/887* (2013.01); *G01S 2013/468* (2013.01)
(58) Field of Classification Search
  USPC .......................................................... 342/42
  See application file for complete search history.

(56) References Cited

U.S. PATENT DOCUMENTS

| | | | | |
|---|---|---|---|---|
| 7,864,107 B1* | 1/2011 | Lehtola | ................ | G01S 13/887 342/146 |
| 9,293,812 B2* | 3/2016 | Shi | ...................... | H01Q 9/0435 |
| 9,715,609 B1* | 7/2017 | Fink | ..................... | H04B 7/0408 |
| 10,044,104 B1* | 8/2018 | Bartko | ..................... | H01Q 3/08 |
| 10,592,736 B2* | 3/2020 | Xiao | ...................... | G06V 30/36 |
| 10,754,010 B2* | 8/2020 | Hinderling | ......... | G01N 21/6445 |
| 10,962,634 B2* | 3/2021 | Gulden | ......... | G01S 13/003 |
| 11,221,396 B2* | 1/2022 | Stark | ..................... | G01S 7/282 |
| 2003/0004776 A1* | 1/2003 | Perrella | ............... | G06Q 10/109 705/7.19 |
| 2003/0179126 A1* | 9/2003 | Jablonski | ................. | G01S 7/41 342/90 |
| 2005/0270229 A1* | 12/2005 | Stephens | ................... | G01S 7/42 342/146 |
| 2006/0109159 A1* | 5/2006 | Holly | ..................... | G01S 13/74 342/126 |
| 2006/0188133 A1* | 8/2006 | Schallig | ............ | G01B 11/2527 382/128 |
| 2007/0054617 A1* | 3/2007 | Nikolajevic | ........... | H04B 7/086 455/63.4 |
| 2010/0289744 A1* | 11/2010 | Cohen | ................... | G06F 3/0395 345/163 |
| 2011/0231150 A1* | 9/2011 | Burns | ................... | G01S 13/887 702/158 |
| 2011/0298647 A1* | 12/2011 | Long | ................... | G01S 13/9027 342/22 |
| 2012/0256786 A1* | 10/2012 | Bowring | ................ | G01S 7/025 342/188 |
| 2015/0042505 A1* | 2/2015 | Hope | ..................... | G01S 13/937 342/41 |
| 2015/0198708 A1* | 7/2015 | Khan | ................... | G01S 13/878 342/146 |
| 2015/0234033 A1* | 8/2015 | Jamieson | .................. | G01S 3/12 455/456.1 |
| 2016/0054440 A1* | 2/2016 | Younis | ................. | G01S 13/867 342/55 |
| 2016/0345286 A1* | 11/2016 | Jamieson | ................. | G01S 3/48 |
| 2018/0074179 A1* | 3/2018 | Liao | ..................... | G01S 13/06 |
| 2018/0156895 A1* | 6/2018 | Hinderling | ............. | G01S 17/08 |
| 2021/0364610 A1* | 11/2021 | Oeguen | ................. | G01B 11/026 |

FOREIGN PATENT DOCUMENTS

| | | | | |
|---|---|---|---|---|
| DE | 102013011220 A1 | | 1/2015 | |
| EP | 1744177 A1 | * | 1/2007 | ......... G01S 13/0209 |
| EP | 2500749 A1 | * | 9/2012 | ........... F41H 11/136 |
| EP | 3014297 B1 | * | 1/2020 | ........... G01S 13/003 |
| WO | WO-02065419 A1 | | 8/2002 | |
| WO | WO-2015000784 A2 | * | 1/2015 | ............ F41H 11/136 |
| WO | WO-2018202696 A1 | * | 11/2018 | ............ G01B 11/06 |

\* cited by examiner

METHOD FOR DETERMINING THE POSITION OF AN OBJECT, DEVICE FOR DETERMINING THE POSITION OF AN OBJECT, AND SYSTEM

CROSS-REFERENCE TO RELATED APPLICATIONS

This application is a national phase application of PCT Application No. PCT/EP2019/079642, filed on 30 Oct. 2019, which claims the benefit of and priority to German Patent Application No. 10 2018 128 962.6, filed on 19 Nov. 2018. The entire disclosures of the applications identified in this paragraph are incorporated herein by references.

FIELD

The invention relates to a method for determining a position of an object which comprises at least one non-linear component, in particular a semiconductor component.

The invention further relates to a device for determining a position of an object which comprises at least one non-linear component, in particular a semiconductor component.

The invention also relates to a system, in particular a vehicle, a trailer, or a container, which comprises such a device and/or carries out such a method.

BACKGROUND

DE 10 2006 038 627 A1 discloses the use of a detector to determine electronic components, such as those used in ignition devices of bombs, to detect non-linear transitions of boundary layers, in particular the p-n junctions of semiconductor components (diodes, transistors, etc.). The mode of operation of these detectors (NLJ detector: non-linear junction detector), also described, for example, in WO 02/065419 A1 and referred to as NLJ detectors, is that a primary high-frequency signal from a transmitting antenna is radiated onto the object to be examined. If, for example, semiconductor components are present in the object, the primary high-frequency radiation induces a voltage at the p-n junctions of the corresponding semiconductor component, which acts like a current-carrying conductor and thus induces its own electromagnetic field, the second and/or third harmonics (secondary high-frequency radiation) of which can in turn be received and evaluated by a reception and evaluation unit via a reception antenna.

With these known methods and devices it has hitherto only been possible to determine the presence of boundary layer transitions.

In particular, if areas are to be examined for booby traps that are further away from the NLJ detector (for example, checking the surroundings of a road from an armored vehicle), it is also necessary to know the distance of the booby trap from the detector in order to be able to initiate measures to defuse or destroy the corresponding booby trap if necessary.

DE 10 2013 011 220 A1 discloses a method for determining the distance of an object that comprises at least one non-linear component, the disclosure of which is fully incorporated into this application by reference. From this is a method for determining the distance of an object that contains at least one non-linear component which, when irradiated with a high-frequency pulse-shaped or periodically frequency-modulated transmitted signal, produces and re-emits an object signal having twice and/or three times the frequency of the transmitted signal.

Proceeding from this, the invention is based on the object of creating a method, a device, and/or a system of the type mentioned at the outset that allows a position of an object that has at least one non-linear component to be determined.

SUMMARY

This object is achieved by the method according to the invention according to claim 1 and the device according to the invention according to claim 10. Advantageous embodiments and developments are the subject of the respective dependent claims.

According to the invention, a method for determining a position of an object, which comprises at least one non-linear component, in particular one semiconductor component, which is configured to, when irradiated with high-frequency transmitted signals from at least two different positions, produces and emits object signals having twice and/or three times the frequency of the respective transmitted signals.

The device according to the invention for determining a position of an object, which comprises at least one non-linear component, in particular one semiconductor component, which, when irradiated with high-frequency transmitted signals from at least two positions, object signals having twice and/or three times the frequency (2nd harmonics, 3rd harmonics) of the respective transmitted signal, to produce and to emit.

Furthermore, the invention provides a system, in particular a vehicle, trailer, or container, which comprises such a device or a device further developed as described below.

This ensures that the object position of an object can be determined with at least one non-linear component. To achieve this, high-frequency transmitted signals are emitted from at least two different positions. Each transmitted signal that hits the object, more precisely the non-linear component, produces an object signal having twice or three times the frequency of the respective transmitted signal. The produced object signals are re-emitted and the position of the object can be determined on the basis of the emitted object signals. It has been found that this method is less susceptible to interference and that the accuracy that can be achieved is higher. Furthermore, only the position and not just the distance to an object is detected with this method.

The device according to the invention and its developments are designed accordingly in order to carry out the method according to the invention as well as the development of the method in a suitable manner. These device-related developments have the same advantages that have been described with regard to the method.

In an advantageous development, the method can include the following features: determining the angle of incidence having a maximum backscatter power of each transmitted signal, and determining a position of the object by triangulation on the basis of the angle of incidence having the maximum backscatter power of each transmitted signal and on the basis of the positions from which the transmitted signals were emitted.

This ensures that an angle of incidence having a maximum backscatter power is determined for each transmitted signal. This happens for every transmitted signal that was sent out from a different position. The position of the object is determined by triangulation on the basis of the angle of incidence having maximum backscatter power of each transmitted signal detected in this way and on the basis of the positions from which the transmitted signals were emitted.

This provides a simple but robust method that allows the position of the object to be determined in a simple and robust manner.

Furthermore, the method can comprise the following steps: irradiating the object with at least two transmitted signals emitted from different positions by means of at least one transmitting device; receiving the object signals emitted by the non-linear components with twice and/or three times the frequency of the transmitted signals by means of at least one receiving device; determining a backscatter power of the object signals taking into account an angle of incidence of the transmitted signals. These steps are preferably carried out before determining the angle of incidence having a maximum backscatter power of each transmitted signal.

This provides a possibility of determining how the backscatter power is to be determined. First, the object is irradiated from two different positions by means of at least one transmitting device. The object signals emitted by the non-linear components of the object are then received by means of at least one receiving device and the backscatter power is determined taking into account the angle of incidence of the transmitted signals. In addition to this possibility of determining the backscatter power of the object signals, other possibilities are also conceivable.

The method steps are preferably carried out in the above-mentioned order, furthermore preferably in direct succession.

In a development of the method, it can be provided that the backscatter power of the object signals is integrated with angular resolution over the entire frequency range of the object signals to detect the angle of incidence having the maximum backscatter power. For this purpose, the integral of the backscatter power of the object signals is drawn for each angle of incidence over the entire frequency range, and thus the maximum backscatter power is determined with angular resolution. Because the transmitted signals are emitted from two different positions, the method according to the invention makes it possible to determine not only the distance but also the position of the object.

Furthermore, the method can provide that, on the basis of a shape of the antenna lobes, in particular an opening angle of the main lobes, of the transmitting and/or receiving devices, and on the basis of the angle of incidence having the maximum backscatter power, a position of maximum distance and a position of minimum distance are determined.

For each angle of incidence having the maximum backscatter power, there is therefore a specific measurement tolerance, which is defined by the shape of the antenna lobes, in particular the opening angles of the main lobes. This measurement tolerance is taken into account accordingly in this embodiment of the method.

In one embodiment, an angle range can be assigned to each angle of incidence having the maximum backscatter power. In an advantageous further development, these are the opening angles of the main lobes. These angular ranges of each angle of incidence having the maximum backscatter power intersect, and intersection points result which define the region in which the object is located. These intersection points define a position of maximum distance and a position of minimum distance.

In one embodiment of the method, it can be provided that the position of the object is determined from the position of maximum distance and the position of minimum distance.

The position of the object is then determined from the initially detected position of maximum distance and the position of minimum distance, for example by determining an average value, so that the position of the object is determined to be centered between the position of maximum distance and the position of minimum distance. However, other mathematical methods than the determination of a mean value are also conceivable, such as, for example, the detection of a center of gravity, of an area spanned by the points of intersection of the angular regions.

Furthermore, the method can provide that the angle of incidence of each transmitted signal is set by mechanically and/or electronically pivoting the antenna lobes of the transmitting devices.

Mechanical pivoting is implemented by pivoting the entire device or the transmitting device. Electronic pivoting can be implemented, for example, in that only specific parts of an array of a transmitting device emit transmitted signals of a specific angle, and then other parts of the array emit transmitted signals with a different angle of incidence. What is achieved hereby is that the transmitted signals are transmitted only in a specific angular range with a delay and thus scanning of an entire pivoting range of the transmitting device is realized.

The method can further provide that each transmitted signal is emitted from one single transmitting device, and is received by one single receiving device, the transmitting device in a first position emitting transmitted signals and the receiving device receiving object signals and subsequently, preferably by moving under its own power or by transport, re-emitting transmitted signals and receiving object signals in further positions. For this embodiment of the method, it is provided that only one transmitting device and one receiving device are required. This device is preferably attached to a system, such as a vehicle, a trailer, or a container, in order to be transported to various positions from which transmitted signals are emitted and object signals are received. In addition, a method is specified which makes it possible to determine the position of the object with a simply designed device which has only one transmitting device and one receiving device. The method created in this way provides for a more time-consuming change in the position of the device for carrying out the method, but makes it possible to implement an implementation in accordance with the method with a comparatively simple device.

In addition, the method can provide that each transmitted signal is emitted from a different transmitting device, which are arranged in each case in different positions, and the respective object signal is received in each case by a receiving device assigned to the respective transmitting devices. For the configuration of the method according to this embodiment, it is provided that transmitted signals are emitted from different transmitting devices, which are each arranged in different positions. The device thus comprises a plurality of transmitting devices which allow transmitted signals to be transmitted from different positions in a short time or also simultaneously and to receive the object signals produced by the transmitted signals with receiving devices assigned to the respective transmitting devices. Hereby, a method is provided which makes it possible to realize an implementation according to the method without a relatively time-consuming change in the position of the device for carrying out the method.

The device preferably provides a circuit device which is configured to measure the angle of incidence having the maximum backscatter power of each transmitted signal, and to determine a position of the object by triangulation on the basis of the angle of incidence having the maximum backscatter power of each transmitted signal and on the basis of the positions.

In one embodiment of the device, it can be provided that the device comprises at least one transmitting device to produce at least two transmitted signals emitted from different positions. Furthermore, it can be provided in one embodiment that at least one receiving device for receiving object signals, the frequency of which corresponds to two and/or three times the frequency of the respective transmitted signals. The at least one transmitting device and the at least one receiving device are preferably operationally connected to the circuit device. The circuit device can be configured to determine the backscatter power of the object signals taking into account an angle of incidence of the transmitted signals.

Furthermore, it can be provided that each transmitting device is assigned a receiving device for receiving the respective object signal, i.e. is positioned identically or substantially identically.

In one embodiment of the device and also of the method, it can also be provided that the transmitting devices and the receiving devices are each combined to form a transmitting and receiving device.

In one embodiment of the device, it can be provided that the circuit device is configured to integrate the backscatter power of the object signals with angular resolution over the entire frequency range of the object signals.

Furthermore, in one embodiment of the device, it can be provided that the circuit device is configured on the basis of a shape of the antenna lobes, in particular an opening angle of the main lobes, of the transmitting and/or receiving devices, and on the basis of the angle of incidence having the maximum backscatter power to determine a position of maximum distance and a position of minimum distance.

In a further development of the device, it can be provided that the circuit device is configured to determine the position of the object from the position of maximum distance and the position of minimum distance.

In one advantageous development of the device, it can be provided that the angle of incidence of each transmitted signal can be set by mechanically and/or electronically pivoting the antenna lobes of the transmitting devices.

In one embodiment of the device, it can also be provided that the device comprises one single transmitting device for the emission of each transmitted signal, and one single receiving device for receiving each received signal, the device being configured to emit transmitted signals, preferably by moving under its own power or by transport, by means of the transmitting device in a first position and to receive object signals by means of the receiving device, and subsequently to re-transmit transmitted signals by means of the transmitting device and to receive object signals by means of the receiving device in further positions.

This provides a device which allows the position of the object to be determined with one single transmitting device and one single receiving device. Thus, the position of the object can be surely determined by a device having a simple configuration.

Furthermore, the device can provide that the device comprises at least two transmitting devices for emitting transmitted signals, each in different positions. A receiving device for receiving the respective object signal is preferably assigned to each transmitting device.

In one embodiment of the device, an array can be formed for this purpose, which has a plurality of spaced-apart subarrays or antennas as transmitting devices. Individual differently positioned antennas can also be provided as transmitting devices. A combination of arrays, subarrays, and/or antennas is also possible.

The distances between the transmitting units and the receiving units can be of different sizes or equidistant. An equidistant arrangement has the advantage that a high signal-to-noise ratio can be achieved. Different distances have the advantage that the number of ambiguities can be reduced.

Furthermore, the accuracy of the device and of the method can be improved by combining with a time difference measurement between the transmission and reception of the signals of the induced object signal.

It may also be possible to increase the accuracy of the device and the method by combining them with FMCW METHODS or FSK methods.

BRIEF DESCRIPTION OF THE DRAWINGS

The invention is to be explained below by way of example based on embodiments with reference to the drawings.

In the drawings.

DETAILED DESCRIPTION

Figure 1:
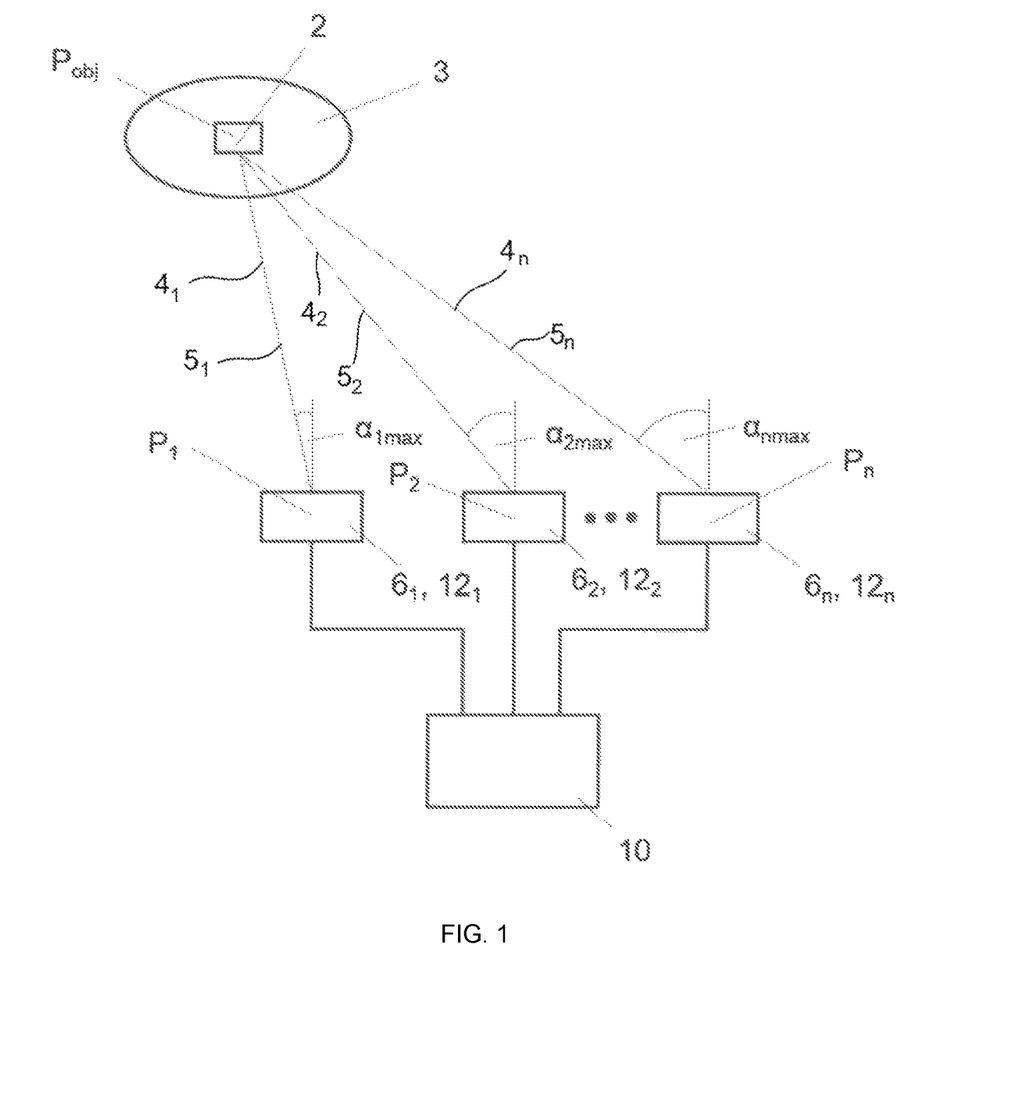
FIG. 1 is a schematic representation of a device according to the invention in accordance with one embodiment.

FIG. 1 shows a device 1 according to the invention for determining a position of an object 2. The object 2 comprises at least one non-linear component 3. The non-linear component 3 preferably has a semiconductor component. When irradiated with high-frequency transmitted signals $4_1, 4_2, 4_n$ by means of the device, object signals $5_1, 5_2, 5_n$ having twice and/or three times the frequency of the respective transmitted signal $4_1, 4_2, 4_n$ are produced and re-emitted.

As shown in FIG. 1, the device 1 comprises at least two transmitting devices $6_1, 6_2, 6_n$ to produce at least two transmitted signals $4_1, 4_2, 4_n$ emitted from different positions $P_1, P_2, P_n$. According to FIG. 1, a plurality of transmitting devices $6_1, 6_2, 6_n$ are formed for this purpose, which are arranged in different positions $P_1, P_2, P_n$.

Furthermore, the device 1 comprises a plurality of receiving devices $12_1, 12_2, 12_n$ for receiving object signals $5_1, 5_2, 5_n$, the frequency of which corresponds to two and/or three times the frequency of the respective transmitted signals $4_1, 4_2, 4_n$.

It can also be provided that the transmitting devices $6_1, 6_2, 6_n$ and the receiving devices $12_1, 12_2, 12_n$ are combined in each case to a transmitting and receiving device $6_1, 12_1; 6_2, 12_2; 6_n, 12_n$.

The device thus has at least two transmitting devices $6_1, 6_2, 6_n$ for emitting transmitted signals $4_1, 4_2, 4_n$, which are each arranged in different positions $P_1, P_2, P_n$. Each transmitting device $6_1, 6_2, 6_n$ is assigned a receiving device $12_1$, $12_2$, $12_n$ for receiving the respective object signal $5_1$, $5_2$, $5_n$ i.e. they are positioned identically or substantially identically.

In addition, the device 1 comprises a circuit device 10 to which the transmitting devices $6_1$, $6_2$, $6_n$ and the receiving devices $12_1$, $12_2$, $12_n$ are operationally connected. The circuit device 10 is configured to determine the backscatter power of the object signals $5_1$, $5_2$, $5_n$ received by the receiving devices taking into account the angle of incidence α1, α2, αn of the transmitted signals $4_1$, $4_2$, $4_n$.

The angle of incidence α1, α2, αn of each transmitted signal $4_1$, $4_2$, $4_n$ can be set by mechanically and/or electronically pivoting the antenna lobes $7_1$, $7_2$, $7_n$ of the transmitting devices $6_1$, $6_2$, $6_n$. The circuit device 10 is also configured to determine the angle of incidence having the maximum backscatter power α1max, α2max, αnmax of each transmitted signal $4_1$, $4_2$, $4_n$. For this purpose, the circuit device 10 is configured to integrate the backscatter power of the object signals $5_1$, $5_2$, $5_n$ with angular resolution over the entire frequency range of the object signals $5_1$, $5_2$, $5_n$. These backscatter powers are detected and compared for each angle of incidence of a transmitting device $6_1$, $6_2$, $6_n$. The angle of incidence α1, α2, αn for which the greatest backscatter power is detected is the angle of incidence having the maximum backscatter power α1max, α2max, αnmax of each transmitted signal $4_1$, $4_2$, $4_n$.

Furthermore, the circuit device 10 is configured to determine a position Pobj of the object 2 by triangulation on the basis of the angle of incidence having the maximum backscatter power α1max, α2max, αnmax of each transmitted signal and on the basis of the positions $P_1$, $P_2$, $P_n$. A more detailed description of the position determination by means of the circuit device 10 by triangulation is given below with reference to FIG. 3.

Figure 2:
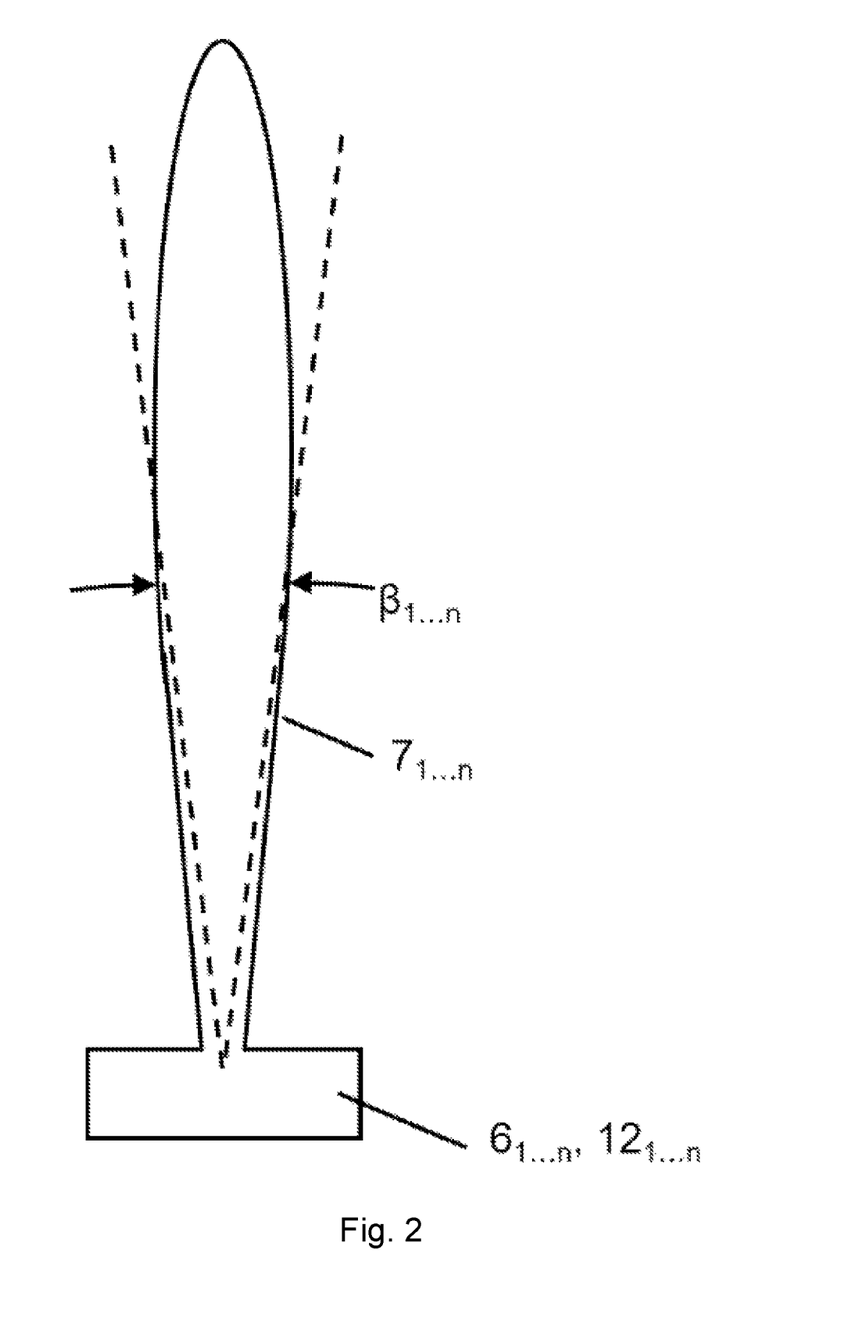
FIG. 2 is a schematic representation of a transmitting and receiving device.

FIG. 2 shows a transmitting device $6_1$, $6_2$, $6_n$ or receiving device $12_1$, $12_2$, $12_n$ according to the present invention. FIG. 2 shows the transmission characteristics of the transmitting device $6_1$, $6_2$, $6_n$ and the receiving device $12_1$, $12_2$, $12_n$. FIG. 2 shows the shape of the main lobe of the respective antenna lobes $7_1$, $7_2$, $7_n$ and the opening angles β1, β2, β3 of the main lobe marked accordingly.

Figure 3:
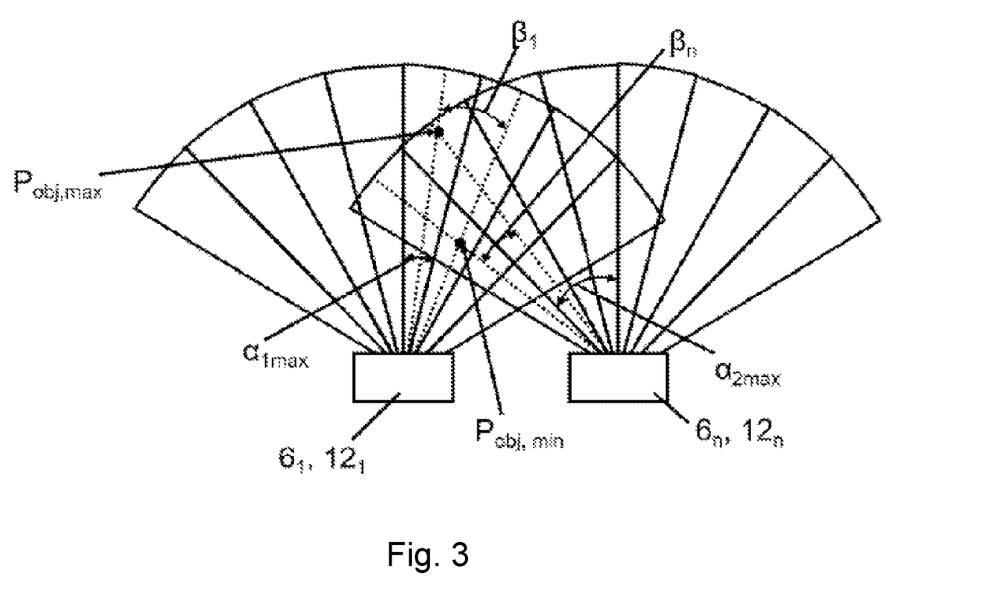
FIG. 3 is a schematic representation of the device according to the invention in accordance with the embodiment shown in FIG. 1.

FIG. 3 schematically shows the device according to FIG. 1. Two transmitting devices $6_1$, $6_2$, $6_n$ and two receiving devices $12_1$, $12_2$, $12_n$ are shown in this case by way of example for purposes of illustration. Each transmitted signal $4_1$, $4_2$, $4_n$ is emitted from a different transmitting device $6_1$, $6_2$, $6_n$, which are arranged in each case in different positions $P_1$, $P_2$, $P_n$, and the respective object signal $5_1$, $5_2$, $5_n$ is received in each case by a receiving device $12_1$, $12_2$, $12_n$ assigned to the respective transmitting devices $6_1$, $6_2$, $6_n$.

As shown in FIG. 3, the entire pivoting range of the antenna lobes $7_1$, $7_2$, $7_n$ is shown, through which range the respective angle of incidence α1, α2, αn can pass when pivoting.

The method for determining a position of the object is described below on the basis of its method steps according to FIG. 3. As can be seen in FIG. 3, irradiating the object 2 with at least two transmitted signals $4_1$, $4_2$, $4_n$ emitted from different positions $P_1$, $P_2$, $P_n$ by means of the transmitting devices $6_1$, $6_2$, $6_n$ takes place. Subsequently, the object signals $5_1$, $5_2$, $5_n$ emitted by the non-linear components 3 having twice and/or three times the frequency of the transmitted signals $4_1$, $4_2$, $4_n$ are received by means of at least one receiving device $12_1$, $12_2$, $12_n$. Thereafter, the backscatter power of the object signals $5_1$, $5_2$, $5_n$ is determined taking into account the angle of incidence α1, α2, αn of the transmitted signals $4_1$, $4_2$, $4_n$. For this purpose, the backscatter power of the object signals $5_1$, $5_2$, $5_n$ is integrated with angular resolution over the entire frequency range of the object signals $5_1$, $5_2$, $5_n$ to detect the maximum backscatter power. This process is repeated until a predefined pivoting range or the entire pivoting range has been passed through. For this purpose, the angle of incidence α1, α2, αn of each transmitted signal $4_1$, $4_2$, $4_n$ can be set by mechanically and/or electronically pivoting the antenna lobes $7_1$, $7_2$, $7_n$ of the transmitting devices $6_1$, $6_2$, $6_n$ and runs through the pivoting range. The corresponding backscatter powers are stored with angular resolution. Then, the angle of incidence having the maximum backscatter power α1max, α2max, αnmax of each transmitted signal $4_1$, $4_2$, $4_n$ is determined. Finally, the position Pobj of the object 2 is determined by triangulation on the basis of the angle of incidence having the maximum backscatter power α1max, α2max, αnmax of each transmitted signal $4_1$, $4_2$, $4_n$ and on the basis of the positions $P_1$, $P_2$, $P_n$ from which the transmitted signals $4_1$, $4_2$, $4_n$ were emitted. The positions $P_1$, $P_2$, $P_n$ from which the transmitted signals $4_1$, $4_2$, $4_n$ were emitted are stored in the circuit device 10 for this purpose.

As can be seen in FIG. 3, for each angle of incidence having the maximum backscatter power α1max, α2max, αnmax, there is therefore a specific measurement tolerance, which is defined by the shape of the antenna lobes $7_1$, $7_2$, $7_n$, in particular the opening angles β1, β2, βn of the main lobes. This measurement tolerance is taken into account accordingly in the method shown in FIG. 3. For two transmitting devices $6_1$, $6_2$, $6_n$, this results in two angles of incidence having the maximum backscatter power α1max, α2max, αnmax. Two angular ranges are assigned as a tolerance to these angles of incidence having the maximum backscatter power α1max, α2max, αnmax. In the case of FIG. 3, these are the opening angles β1, β2, βn of the main lobes. In FIG. 3, these are highlighted by dotted lines. As can be seen from FIG. 3, these intersect and intersection points result which define the region in which the object 2 is located. These intersection points define a position of maximum distance Pobj,max and a position of minimum distance Pobj,min. A position Pobj of the object 2 is then detected from these positions, for example by averaging.

The device 1 is designed to implement the method described above accordingly. The circuit device 10 is configured, on the basis of this shape of the antenna lobes $7_1$, $7_2$, $7_n$, of the transmitting and/or receiving devices $6_1$, $6_2$, $6_n$; $12_1$, $12_2$, $12_n$, and on the basis of the angle of incidence having the maximum backscatter power α1max, α2max, αnmax to determine the position of maximum distance Pobj,max and the position of minimum distance Pobj,min. The opening angles β1, β2, β3 of the main lobes are used in particular. Furthermore, the circuit device 10 is configured to determine the position Pobj of the object 2 from the position of maximum distance Pobj,max and the position of minimum distance Pobj,min. In one embodiment, the transmitting and/or receiving device can be arranged on a system, in particular a vehicle, a trailer, or a container, and can be transported into different positions.

Figure 4:
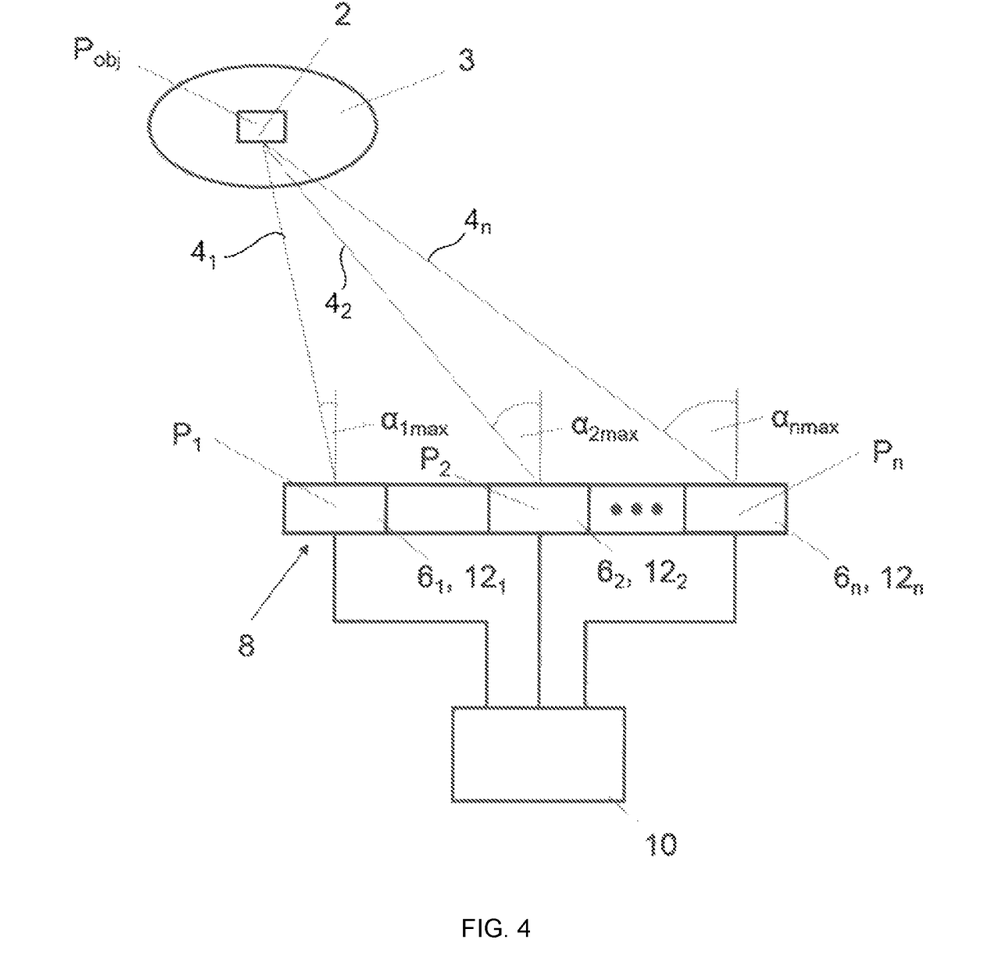
FIG. 4 is a schematic representation of a device according to the invention in accordance with a further embodiment.

FIG. 4 shows a device according to the invention in accordance with a further embodiment which substantially corresponds to the embodiment according to FIG. 1, the differences to the embodiment according to FIG. 1 being explained below. In the embodiment shown in FIG. 4, the transmitting devices $6_1$, $6_2$, $6_n$ and the receiving devices $12_1$, $12_2$, $12_n$ are combined in an array 8. In this case, the individual antennas of the array 8 or subarrays from a plurality of antennas form the transmitting devices $6_1$, $6_2$, $6_n$ and the receiving devices $12_1$, $12_2$, $12_n$. The different positions $P_1$, $P_2$, $P_n$ of the transmitting devices $6_1$, $6_2$, $6_n$ which are designed to emit the transmitted signals $4_1$, $4_2$, $4_n$ and of the receiving devices $12_1$, $12_2$, $12_n$ which are designed to receive the respective object signal are correspondingly predetermined and known on the basis of the predetermined positions of the individual antennas or the subarrays in the array 8.

Figure 5:
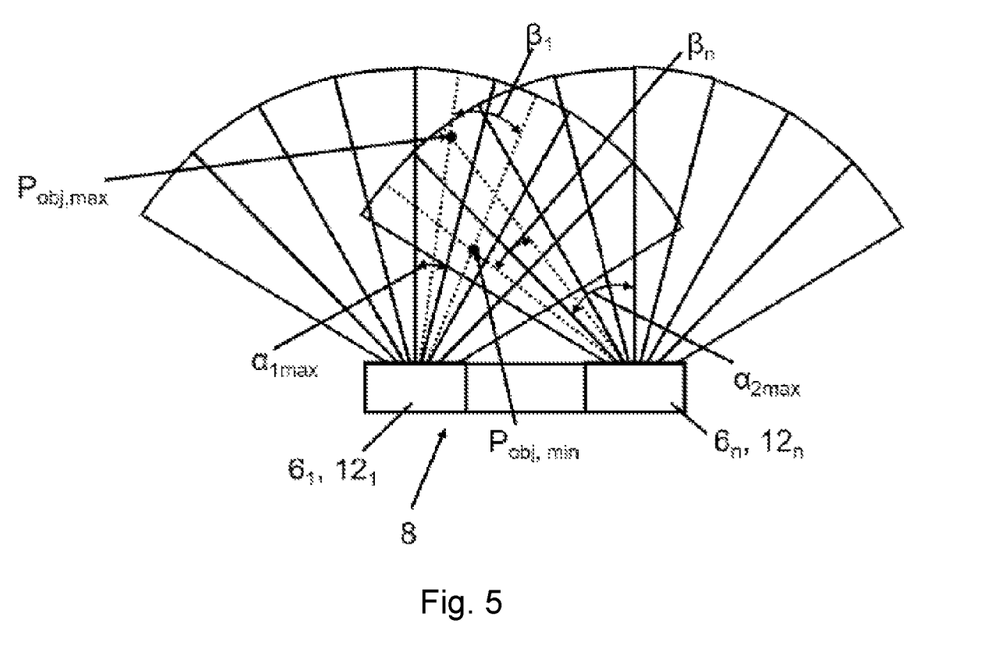
FIG. 5 is a schematic representation of the device according to the invention in accordance with the embodiment shown in FIG. 4.

FIG. 5 shows the device 1 according to the embodiment described in FIG. 4. The implementation of the method substantially corresponds to the implementation described in FIG. 3.

Figure 6:
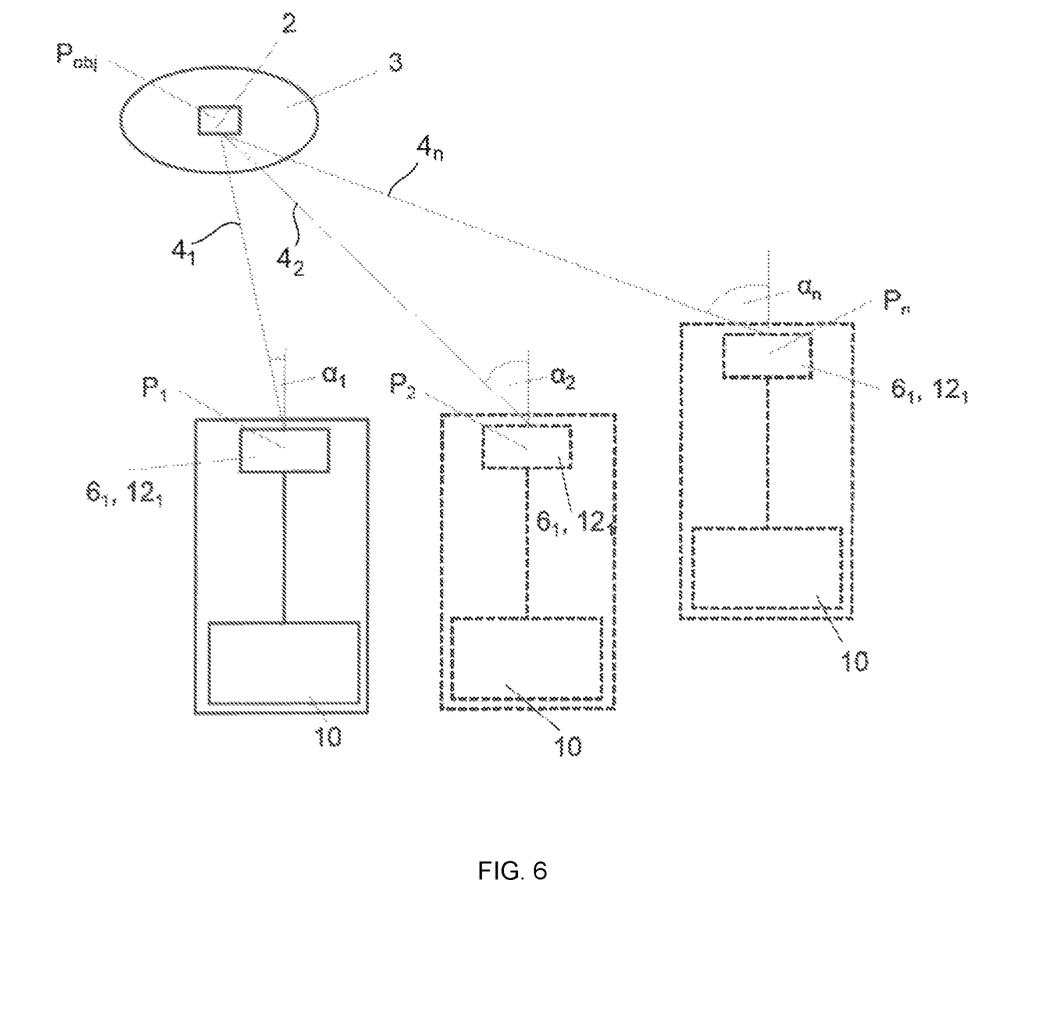
FIG. 6 is a schematic representation of a device according to the invention in accordance with one embodiment.

FIG. 6 shows a device 1 according to the invention in accordance with a further embodiment. The embodiment corresponds substantially to the embodiment according to FIG. 1, the differences of the embodiment according to FIG. 6 embodiment being explained below.

The device 1 shown in FIG. 6 has only one single transmitting device $6_1$. This one transmitting device $6_1$ is used for the emission of each transmitted signal $4_1$, $4_2$, $4_n$. Furthermore, the device has only one single receiving device $12_1$ for receiving each received signal. The device 1 is configured so that the transmitting device $6_1$ and the receiving device $12_1$ emits transmitted signals $4_1$, $4_2$, $4_n$ and receives object signals $5_1$, $5_2$, $5_n$ in a first position $P_1$. It is then provided that the device 1 in a further position $P_2$, $P_n$ re-emits transmitted signals $4_1$, $4_2$, $4_n$ and receives object signals $5_1$, $5_2$, $5_n$.

Figure 7:
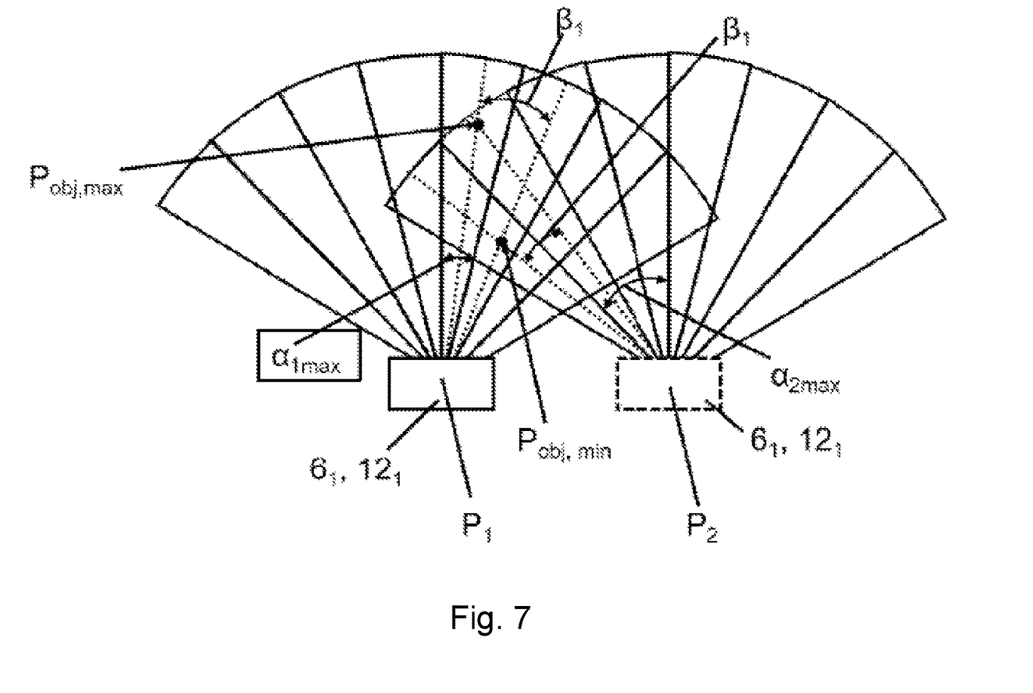
FIG. 7 is a schematic representation of the device according to the invention in accordance with the embodiment shown in FIG. 6.

FIG. 7 shows the device 1 according to the embodiment described in FIG. 6. The implementation of the method substantially corresponds to the implementation described in FIG. 3, with the difference that only one single transmitting device $6_1$ is provided, which is repositioned before the transmitted signals are repeatedly emitted. Every transmitted signal $4_1$, $4_2$, $4_n$ is emitted from one single transmitting device $6_1$ and is received by one single receiving device $12_1$. The transmitting device $6_1$ and the receiving device $12_1$ emit a transmitted signal $4_1$, $4_2$, $4_n$ in the first position P1 and receive the object signals $5_1$, $5_2$, $5_n$. Thereafter, signals are re-emitted and received in further positions $P_2$, $P_n$.

If reference was made above to transmitting devices and receiving devices, these can also be designed accordingly as transmitting and receiving devices.

LIST OF REFERENCE SIGNS

1 Device
2 Object
3 Non-linear component
$4_1$, $4_2$, $4_n$ Transmitted signals
$5_1$, $5_2$, $5_n$ Object signals
$6_1$, $6_2$, $6_n$ Transmitting devices
$7_1$, $7_2$, $7_n$ Antenna lobe
8 Array
10 Circuit device
$12_1$, $12_2$, $12_n$ Receiving devices
$P_1$, $P_2$, $P_n$ Positions
Pobj Position of the object
$\alpha 1$, $\alpha 2$, $\alpha n$ Angle of incidence
$\alpha 1 max$, $\alpha 2 max$, $\alpha n max$ Angle of incidence having maximum backscatter power
$\beta 1$, $\beta 2$, $\beta n$ Opening angle

What is claimed is:

1. A method for determining a position of an object, which comprises at least one non-linear component including a semiconductor component, which, when irradiated with high-frequency transmitted signals from at least two different positions, produces and emits object signals having twice and/or three times the frequency of the respective transmitted signals, the method comprising:
   determining the angle of incidence having a maximum backscatter power of each transmitted signal;
   determining a position of the object by triangulation based on the angle of incidence having the maximum backscatter power of each transmitted signal and on the positions from which the transmitted signals were emitted;
   irradiating, with at least one transmitting device, the object with at least two transmitted signals emitted from different positions;
   receiving, by at least one receiving device, the object signals emitted by the at least one non-linear component having twice and/or three times the frequency of the transmitted signals; and
   determining a backscatter power of the object signals taking into account an angle of incidence of the transmitted signals.

2. The method according to claim 1, wherein the backscatter power of the object signals is integrated with angular resolution over the entire frequency range of the object signals to detect the angle of incidence having the maximum backscatter power.

3. The method according to claim 1, wherein based on a shape of antenna lobes, of the transmitting and/or receiving devices and on the angle of incidence having the maximum backscatter power, a position of maximum distance and a position of minimum distance are determined.

4. The method according to claim 3, wherein the position of the object is determined from the position of maximum distance and the position of minimum distance.

5. The method according to claim 1, wherein the angle of incidence of each transmitted signal is set by mechanically and/or electronically pivoting an antenna lobe of the at least one transmitting device.

6. The method according to claim 1, wherein each transmitted signal is emitted from one single transmitting device, and is received by one single receiving device, the transmitting device in a first position emitting transmitted signals and the receiving device receiving object signals and subsequently, re-emitting transmitted signals and receiving object signals in further positions.

7. The method according to claim 1, wherein each transmitted signal is emitted from a different transmitting device, which are arranged in different positions, and the respective object signal is received by a receiving device assigned to the respective transmitting device.

8. A device for determining a position of an object, which comprises at least one non-linear component including a semiconductor component, which, when irradiated with high-frequency transmitted signals from at least two different positions, produces and emits object signals having twice and/or three times the frequency of the respective transmitted signals, the device comprising:
   a circuit device configured to measure the angle of incidence having a maximum backscatter power of each transmitted signal, and to determine a position of the object by triangulation on the basis of the angle of incidence having the maximum backscatter power of each transmitted signal and on the basis of the positions;
   at least one transmitting device configured to produce at least two transmitted signals emitted from different positions; and at least one receiving device configured to receive object signals, the frequency of which corresponds to two and/or three times the frequency of the respective transmitted signals, wherein the at least one transmitting device and the at least one receiving are operationally connected to the circuit device, which is configured to determine the backscatter power of the object signals taking into account an angle of incidence of the transmitted signals.

9. The device according to claim 8, wherein the circuit device is configured to integrate the backscatter power of the object signals with angular resolution over the entire frequency range of the object signals.

10. The device according to claim 8, wherein the circuit device is configured to determine a position of maximum distance and a position of minimum distance based on a shape of antenna lobes of the transmitting and/or receiving devices and on the angle of incidence having the maximum backscatter power.

11. The device according to claim 8, wherein the circuit device is configured to determine the position of the object from the position of maximum distance and the position of minimum distance.

12. The device according to claim 8, wherein the angle of incidence of each transmitted signal is set by mechanically and/or electronically pivoting an antenna lobe of the at least one transmitting device.

13. The device according to claim 8, wherein the at least one transmitting device is one single transmitting device for the emission of each transmitted signal, and the at least one receiving device is one single receiving device for receiving each received signal, the device being configured to emit transmitted signals via the transmitting device in a first position and to receive object signals via the receiving device, and subsequently to re-transmit transmitted signals via the transmitting device and to receive object signals in further positions.

14. The device according to claim 8, wherein the at least one transmitting device comprises at least two transmitting devices configured to emit transmitted signals in different positions, and wherein the at least one receiving device comprises at least two receiving devices each being assigned to one of the transmitting devices to receive the respective object signal.

15. The device comprising the device according to claim 8.

* * * * *